US012643142B2

(12) United States Patent
Birkbeck et al.

(10) Patent No.: US 12,643,142 B2
(45) Date of Patent: Jun. 2, 2026

(54) ERGONOMIC RIVETING TOOL SYSTEM

(71) Applicant: The Boeing Company, Arlington, VA (US)

(72) Inventors: Steven Birkbeck, Hanahan, SC (US); Bernard Karl Manderville, Mount Pleasant, SC (US); Yasir Mostafa Soliman, Summerville, SC (US)

(73) Assignee: The Boeing Company, Arlington, VA (US)

( * ) Notice: Subject to any disclaimer, the term of this patent is extended or adjusted under 35 U.S.C. 154(b) by 439 days.

(21) Appl. No.: 18/321,393

(22) Filed: May 22, 2023

(65) Prior Publication Data

US 2023/0302529 A1 Sep. 28, 2023

Related U.S. Application Data

(62) Division of application No. 16/866,087, filed on May 4, 2020, now Pat. No. 11,691,194.

(51) Int. Cl.

| | |
|---|---|
| ***B21J 15/30*** | (2006.01) |
| ***B21J 15/04*** | (2006.01) |
| ***B21J 15/10*** | (2006.01) |
| ***B21J 15/18*** | (2006.01) |
| ***B21J 15/20*** | (2006.01) |
| ***B25F 5/02*** | (2006.01) |
| *B21J 15/02* | (2006.01) |
| *B21J 15/14* | (2006.01) |

(52) U.S. Cl.
CPC ............... *B21J 15/30* (2013.01); *B21J 15/04* (2013.01); *B21J 15/105* (2013.01); *B21J 15/18* (2013.01); *B21J 15/20* (2013.01); *B25F 5/02* (2013.01); *B21J 15/02* (2013.01); *B21J 15/142* (2013.01)

(58) Field of Classification Search
CPC . B21J 15/30; B21J 15/04; B21J 15/105; B21J 15/18; B21J 15/20; B21J 15/02; B21J 15/142; B25F 5/02
See application file for complete search history.

(56) References Cited

U.S. PATENT DOCUMENTS 2,416,474 A * 2/1947 Frank ........................ B21J 15/32 227/95
2,844,978 A * 7/1958 Hunter ................... B21J 15/105 60/407
(Continued)

*Primary Examiner* — Ryan J. Walters
(74) *Attorney, Agent, or Firm* — Kunzler Bean & Adamson

(57) ABSTRACT

The present disclosure relates to riveting apparatuses, riveting devices, and methods for their use. An example riveting apparatus includes a pneumatically operated riveting tool having a working end for squeezing a rivet. The riveting apparatus includes a support bracket connected to the riveting tool proximate the working end, the support bracket having arms projecting on each side of the riveting tool. The riveting apparatus also includes a pair of spaced-apart edge rollers coupled to the support arms. The edge rollers are configured to rollably engage an edge of a work-piece so as to support the weight of the riveting tool and enable movable adjustment of the working end relative to the work-piece. The riveting apparatus includes a handle rotatably mounted to the riveting tool to enable axial rotation of the handle, the handle having an actuatable switch configured to selectively operate the riveting tool.

20 Claims, 11 Drawing Sheets

Oblique View

Front View

(56) References Cited

U.S. PATENT DOCUMENTS

| | | | | |
|---|---|---|---|---|
| 6,732,627 | B2 * | 5/2004 | Wattenbach | B23D 59/00 173/171 |
| 11,691,194 | B2 * | 7/2023 | Birkbeck | B21J 15/18 29/525.06 |
| 2007/0066737 | A1 * | 3/2007 | Gallucci | C08L 79/08 525/418 |
| 2010/0064481 | A1 * | 3/2010 | Martin | B25F 5/026 16/426 |

* cited by examiner

Front View

Operating Scenario – Oblique View

Operating Scenario - Oblique View

ERGONOMIC RIVETING TOOL SYSTEM

CROSS-REFERENCE TO RELATED APPLICATION

The present patent application is a divisional of U.S. patent application Ser. No. 16/866,087, filed on May 4, 2020, the entire contents of which is hereby incorporated by reference.

FIELD

The present disclosure generally relates to riveting apparatuses, riveting tools, and methods of their use.

BACKGROUND

Rivet squeezer tools and other hand tools are often designed for general purpose use and can be difficult or uncomfortable to use in various applications. For example, conventional powered hand tools (e.g., electric, hydraulic, and/or pneumatic tools) often lack ergonomic features that could help users avoid repetitive stress injuries, improve tool accuracy/application, and/or otherwise improve user tool experience.

SUMMARY

In an aspect, a riveting apparatus is described. The riveting apparatus includes a pneumatically operated riveting tool having a working end for squeezing a rivet. The riveting apparatus also includes a support bracket connected to the riveting tool proximate the working end. The support bracket has arms projecting on each side of the riveting tool. The riveting apparatus also includes a pair of spaced-apart rollers coupled to the support arms. The edge rollers are configured to rollably engage an edge of a work-piece so as to support the weight of the riveting tool and enable movable adjustment of the working end relative to the work-piece. The riveting apparatus also includes a handle rotatably mounted to the riveting tool to enable axial rotation of the handle. The handle has an actuatable switch configured to selectively operate the riveting tool.

In an aspect, a riveting tool is described. The riveting tool includes a working end and an outer housing. The riveting tool also includes a pair of spaced-apart edge rollers coupled to the outer housing and being configured to rollably engage an edge of a work-piece so as to support the weight of the riveting tool and enable movable adjustment of the working end relative to the work-piece. The riveting tool also includes a pneumatic valve and a handle rotatably mounted to the outer housing to enable axial rotation of the handle. The handle has an actuatable switch configured to selectively operate the pneumatic valve.

In a further aspect, a method is described. The method includes coupling a support bracket to a pneumatically operated riveting tool. The support bracket includes support arms that project to each side of the riveting tool. The support bracket also includes a pair of spaced-apart edge rollers coupled to the support arms. The support bracket additionally includes a handle rotatably mounted to the riveting tool to enable axial rotation of the handle. The handle has an actuatable switch configured to selectively operate the riveting tool. The method includes rollably engaging an edge of a work-piece so as to support the weight of the riveting tool and enable movable adjustment of the working end relative to the work-piece. The method additionally includes operating the riveting tool by actuating the actuatable switch.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

The present disclosure relates to an ergonomic rivet squeezer apparatus or attachment device. In an example embodiment, a riveting tool could be coupled to a support bracket. The handle could be coupled to the support bracket and could be suitable to be held by a user. In some embodiments, the handle could be rotatably mounted with respect to the riveting tool so as to allow both right-handed and left-handed use of the tool.

The handle could include a switch, trigger, button, or another type of device to selectively control the riveting tool. The switching device could be provided by a handle with a palm- or finger-activated switch. The switching device could control the supply flow of electric current, pressurized air, and/or hydraulic fluid to the riveting tool.

In an example embodiment, a pair of edge rollers could be coupled to the support bracket. The edge rollers could be oriented and configured to roll along an edge of a work-piece. The edge rollers could optionally be adjustable to adapt to variously sized/shaped work-pieces.

In some embodiments, the rivet squeezer apparatus/attachment device could be couplable to a suspended support cable and/or a tool balancer.

Some or all of the elements of the support bracket and/or handle could be 3-D printed and/or could be formed from a thermoplastic resin.

The ergonomic rivet squeezer apparatus and methods for its use could help to reduce repetitive stress injuries for users/operators of the riveting tool. Furthermore, the rotatable handle could provide better control and/or handling of the riveting tool, which could improve throughput, improve accuracy, and/or reduce errors in manufacturing.

II. Example Riveting Apparatuses

Figure 1:
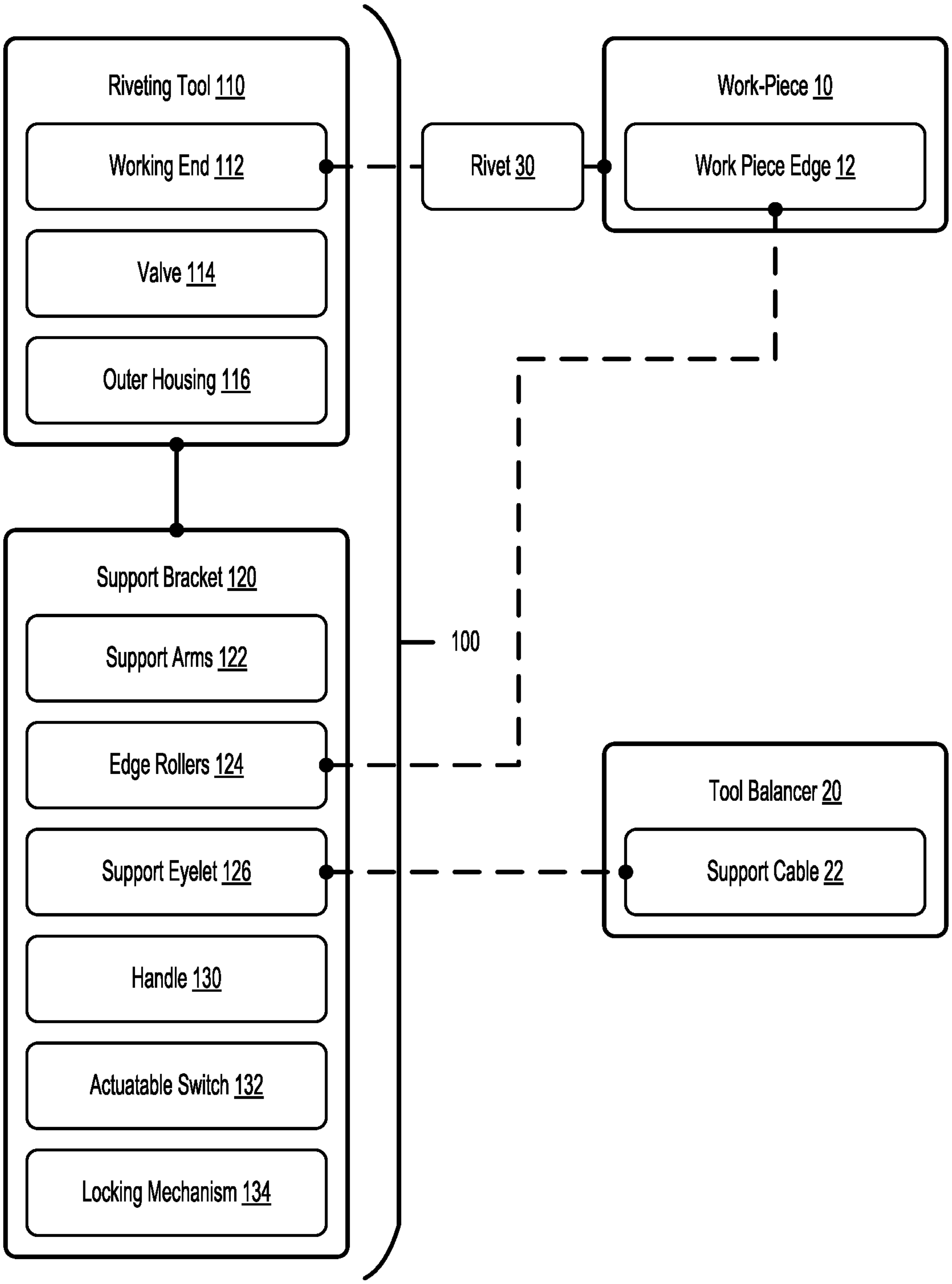
FIG. 1 illustrates a riveting apparatus, according to an example implementation.

FIG. 1 illustrates a riveting apparatus 100, according to an example implementation. The riveting apparatus 100 includes a pneumatically operated riveting tool 110, which has a working end 112 for squeezing a rivet 30 or another type of compressible fastener.

The riveting apparatus 100 additionally includes a support bracket 120 connected to the riveting tool 110 proximate the working end 112. The support bracket 120 includes at least two support arms 122 that project outward from at least two sides of the riveting tool 110.

The riveting apparatus 100 further includes a pair of spaced-apart edge rollers 124 coupled to the support arms 122. The edge rollers 124 are configured to rollably engage an edge 12 of a work-piece 10 so as to support the weight of the riveting tool 110. The edge rollers 124 are also configured to enable movable adjustment of the working end 112 relative to the work-piece 10.

The riveting apparatus 100 yet further includes a handle 130 rotatably mounted to the riveting tool 110 to enable axial rotation of the handle 130. The handle 130 has an actuatable switch 132 configured to selectively operate the riveting tool 110. In some embodiments, the actuatable switch 132 is configured to selectively control a flow of pressurized air to the riveting tool 110, which is configured to be pneumatically actuated.

In some embodiments, the riveting apparatus 100 could additionally include a support eyelet 126 connected to the support bracket 120. The support bracket 120 is configured to be releasably coupled to a suspended support cable 22 to further support the weight of the riveting tool 110. In such scenarios, the suspended support cable 22 could form a portion of a tool balancing device 20. In various embodiments, a position of the support eyelet 126 is adjustable with respect to the support bracket 120.

In example embodiments, the handle 130 having an actuatable switch 132 could include a grip-shaped handle with a pivotal trigger. In such a scenario, the pivotal trigger could be configured to be depressed by an operator. As an example, the actuatable switch 132 could be configured to be actuatable by at least one finger or a palm portion of a user's hand. In various embodiments, depressing the pivotal trigger could actuate a valve to supply flow of pressurized air to the riveting tool 110 so as to selectively operate the riveting tool 110.

In some embodiments, the handle 130 could be contoured and/or shaped to fit a user's hand. Additionally or alternatively, the handle 130 is configured to freely rotate with respect to the support bracket 120. In various embodiments, the handle 130 is configured to rotate with respect to the support bracket 120 through a plurality of lockable handle positions. For example, the support bracket 120 and/or the handle 130 could include a locking mechanism 134 configured to selectively maintain the handle 130 in a locked handle position among the plurality of lockable handle positions.

In various embodiments, the pair of spaced-apart edge rollers 124 could be adjustably coupled to the support arms 122. In some examples, the edge rollers 124 could be configured to be adjusted to align with a contour of an edge 12 of the work-piece 10.

In some embodiments, some or all of the riveting apparatus 100 could be three-dimensionally printed. As an example, the support bracket 120 and/or the handle 130 could a three-dimensionally printed structures. In such scenarios, some or all of the riveting apparatus 100 could be formed from a thermoplastic resin or other types of materials that become pliable or moldable when heated to temperatures above ambient. In one example, the support bracket 120 could be formed from a thermoplastic resin.

Figure 2A:
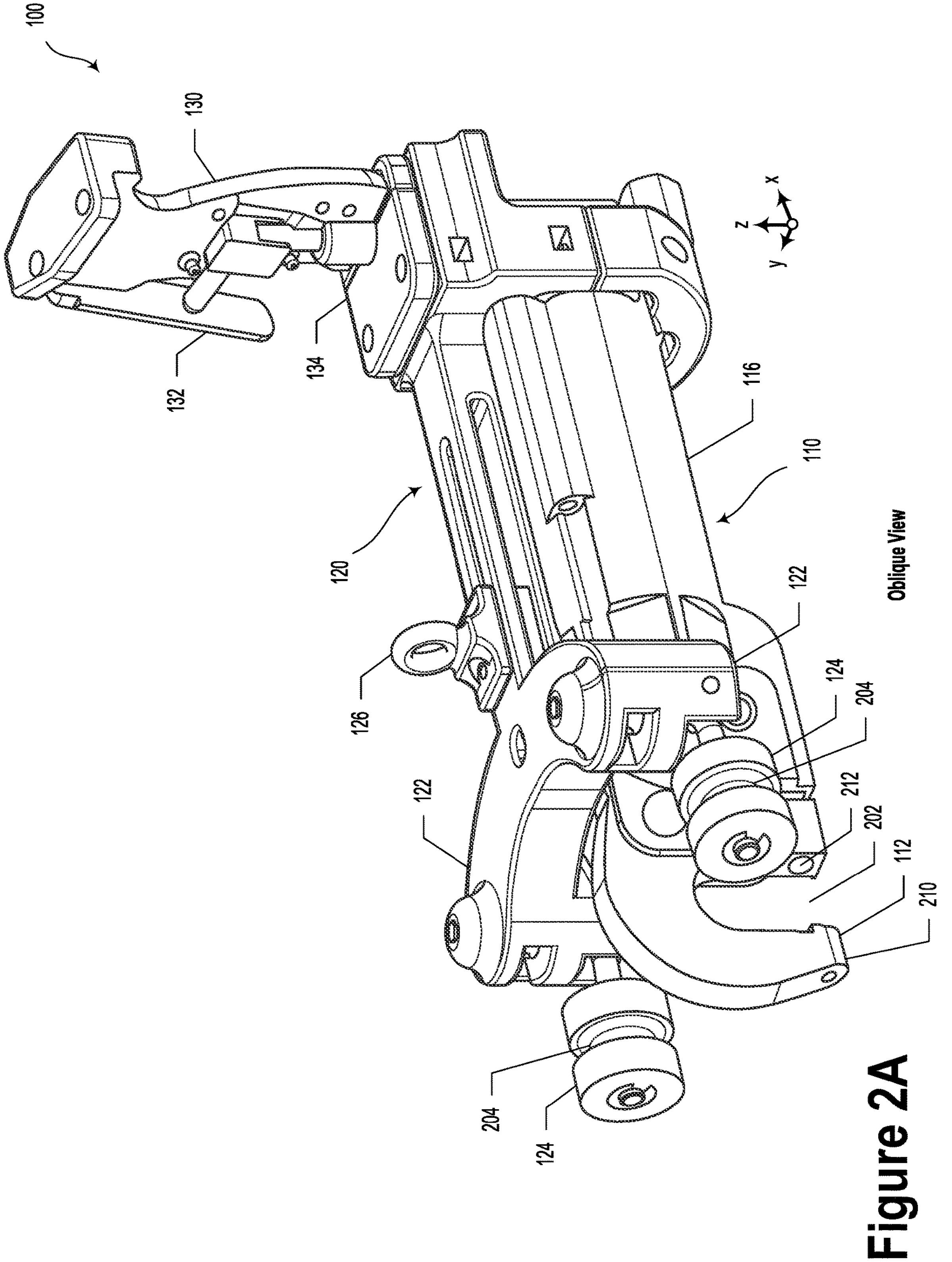
FIG. 2A illustrates the riveting apparatus of FIG. 1, according to an example implementation.

FIGS. 2A-2F illustrate several views and portions of the riveting apparatus 100. FIG. 2A illustrates an oblique view of the riveting apparatus 100 of FIG. 1, according to an example implementation. As illustrated in FIG. 2A, the working end 112 of the riveting tool 110 may include a static portion 210 (e.g., a yoke or an anvil) that is stationary with respect to the outer housing 116. The working end 112 could also include a dynamic portion 212 (e.g., a ram) that is configured to apply pressure to a rivet 30 and work-piece 10 that are placed within an opening 202 of the working end 112. When pressure is applied to the rivet 30 by the ram, the rivet 30 may fasten or couple together multiple layers of the work-piece 10.

Furthermore, in some embodiments, the edge rollers 124 may include one or more slots 204 that are configured to roll along an edge 12 of the work-piece 10. In some embodiments, by engaging the edge rollers 124 with the edge 12 of the work-piece 10, rivets 30 may be positioned at a repeatable location with respect to the edge 12. In such scenarios, the riveting apparatus 100 could provide rivet squeezing operation in a repeatable manner along the edge 12 of the work-piece 10.

Figure 2B:
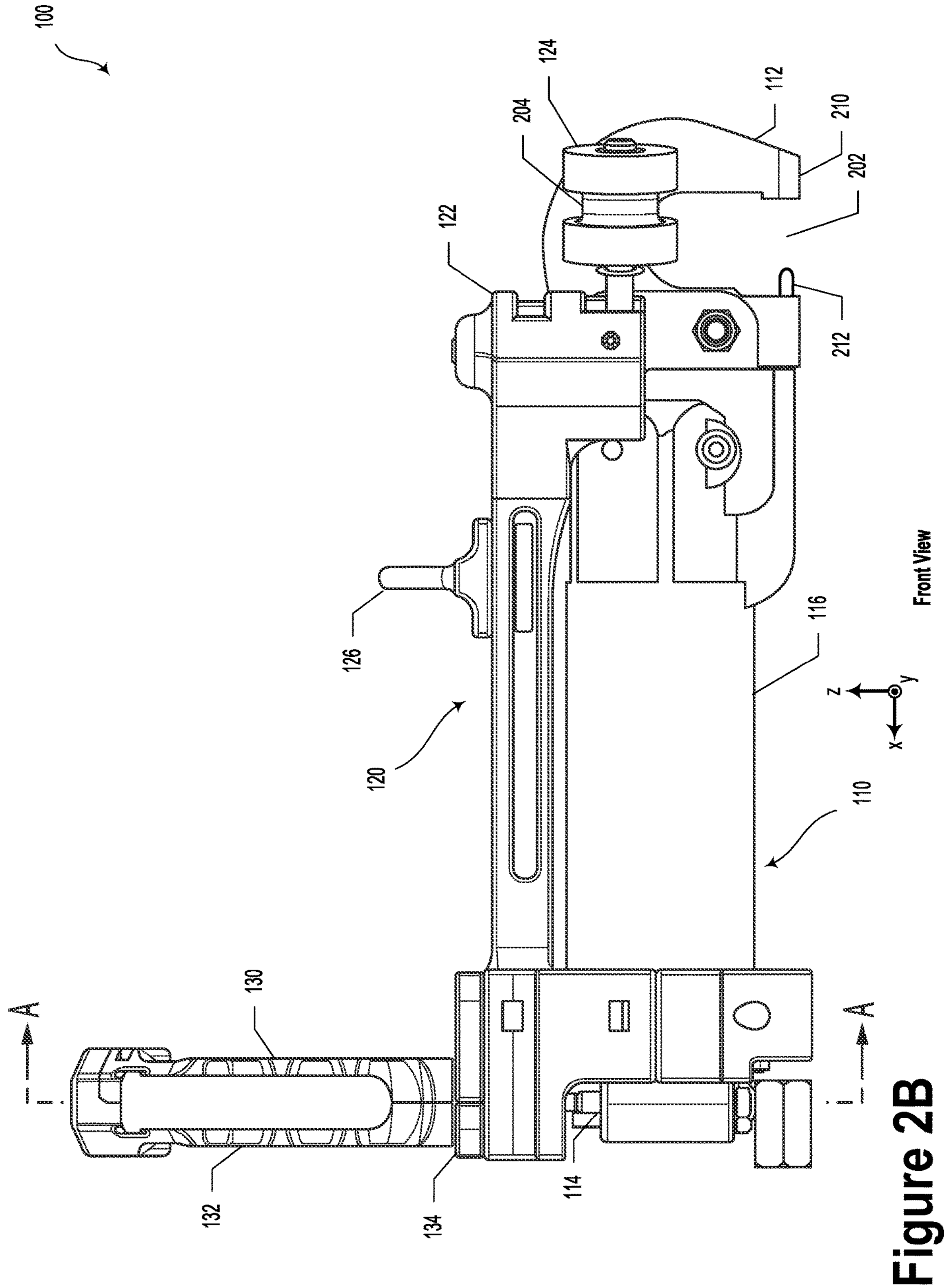
FIG. 2B illustrates the riveting apparatus of FIG. 1, according to an example implementation.

FIG. 2B illustrates a front view of the riveting apparatus 100 of FIG. 1, according to an example implementation.

Figure 2C:
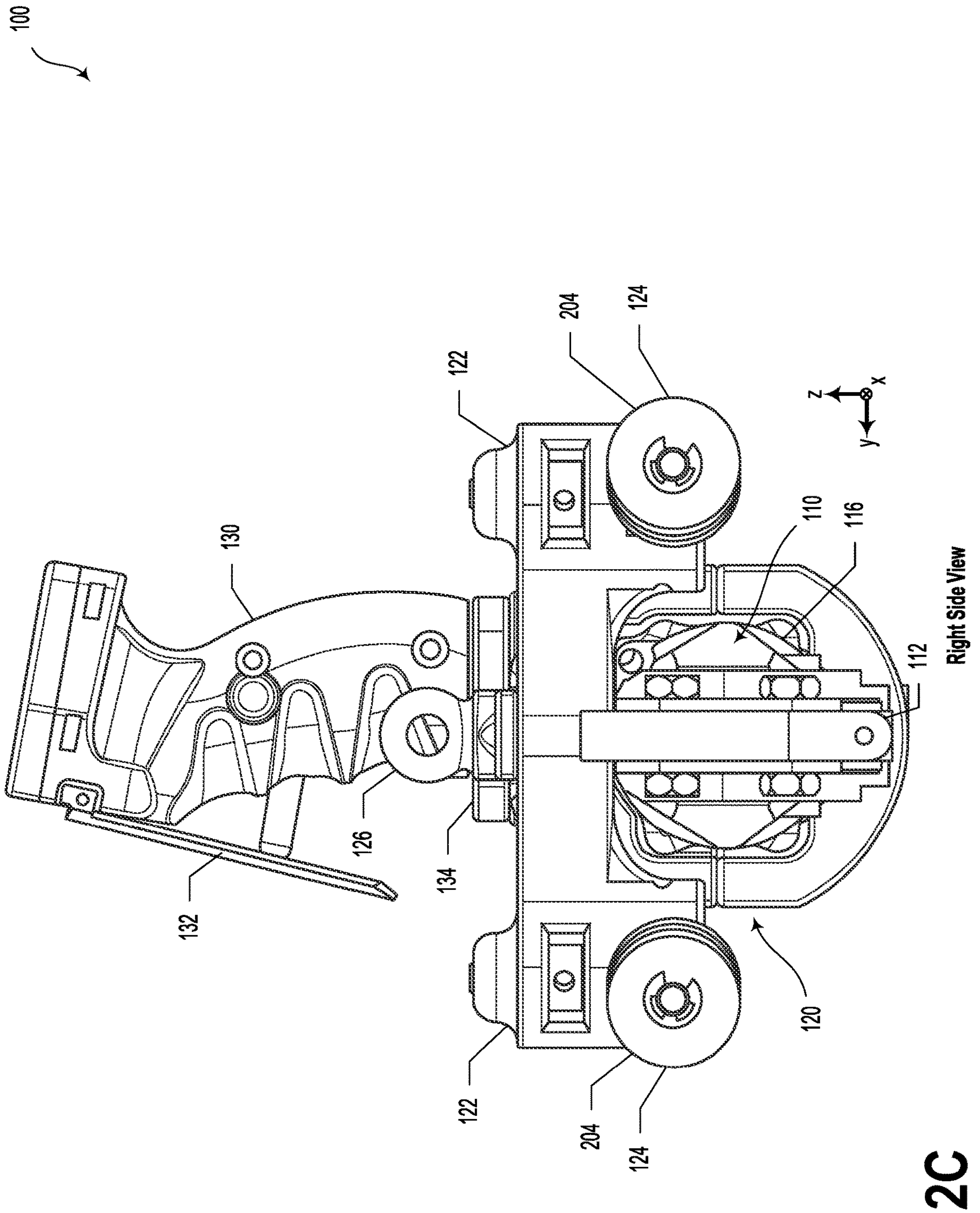
FIG. 2C illustrates the riveting apparatus of FIG. 1, according to an example implementation.

FIG. 2C illustrates a right side view of the riveting apparatus 100 of FIG. 1, according to an example implementation.

Figure 2D:
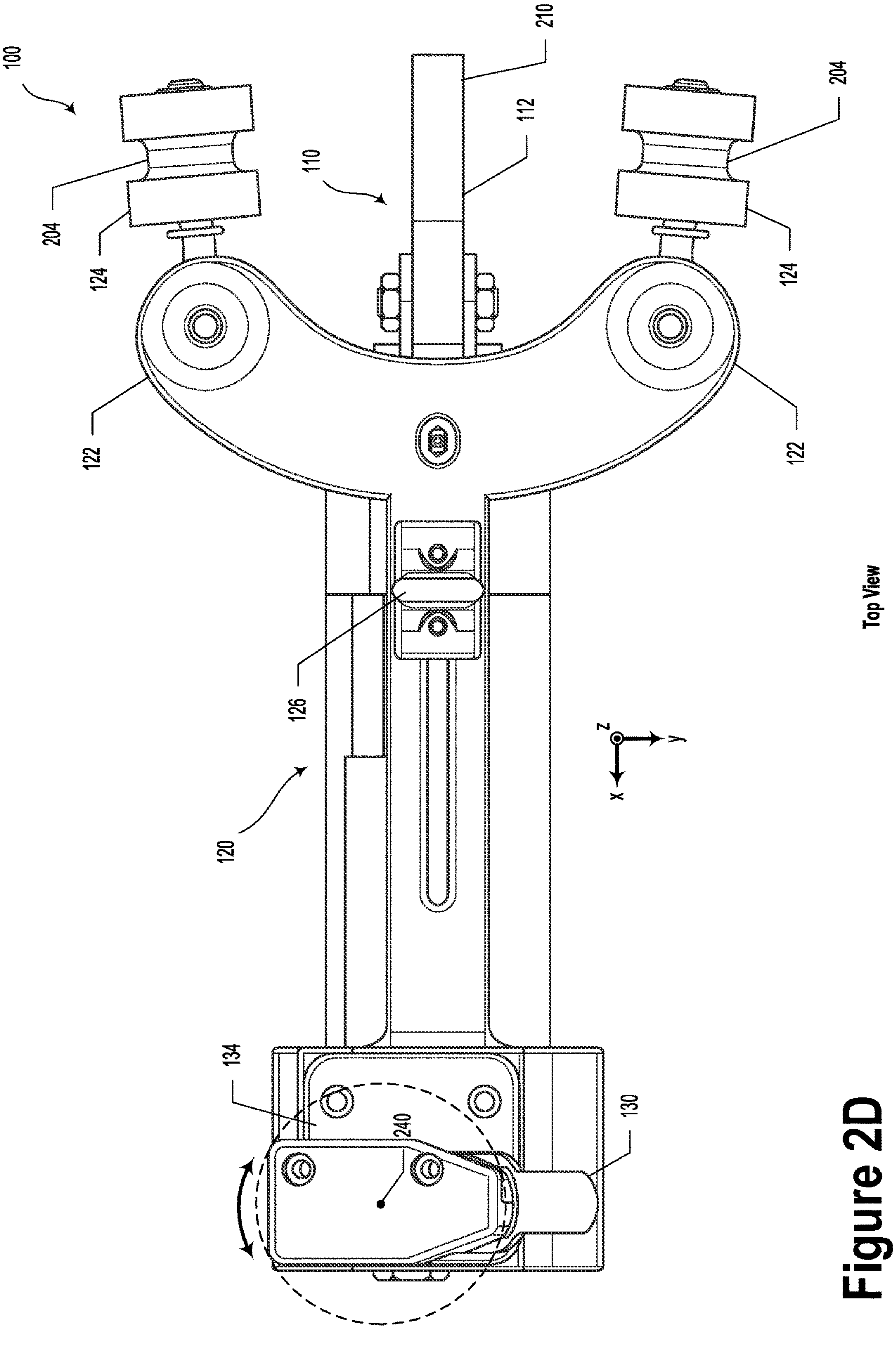
FIG. 2D illustrates the riveting apparatus of FIG. 1, according to an example implementation.

FIG. 2D illustrates a top view the riveting apparatus 100 of FIG. 1, according to an example implementation. As illustrated in FIG. 2D, handle 130 could be configured so as to rotate about an axis 240.

Figure 2E:
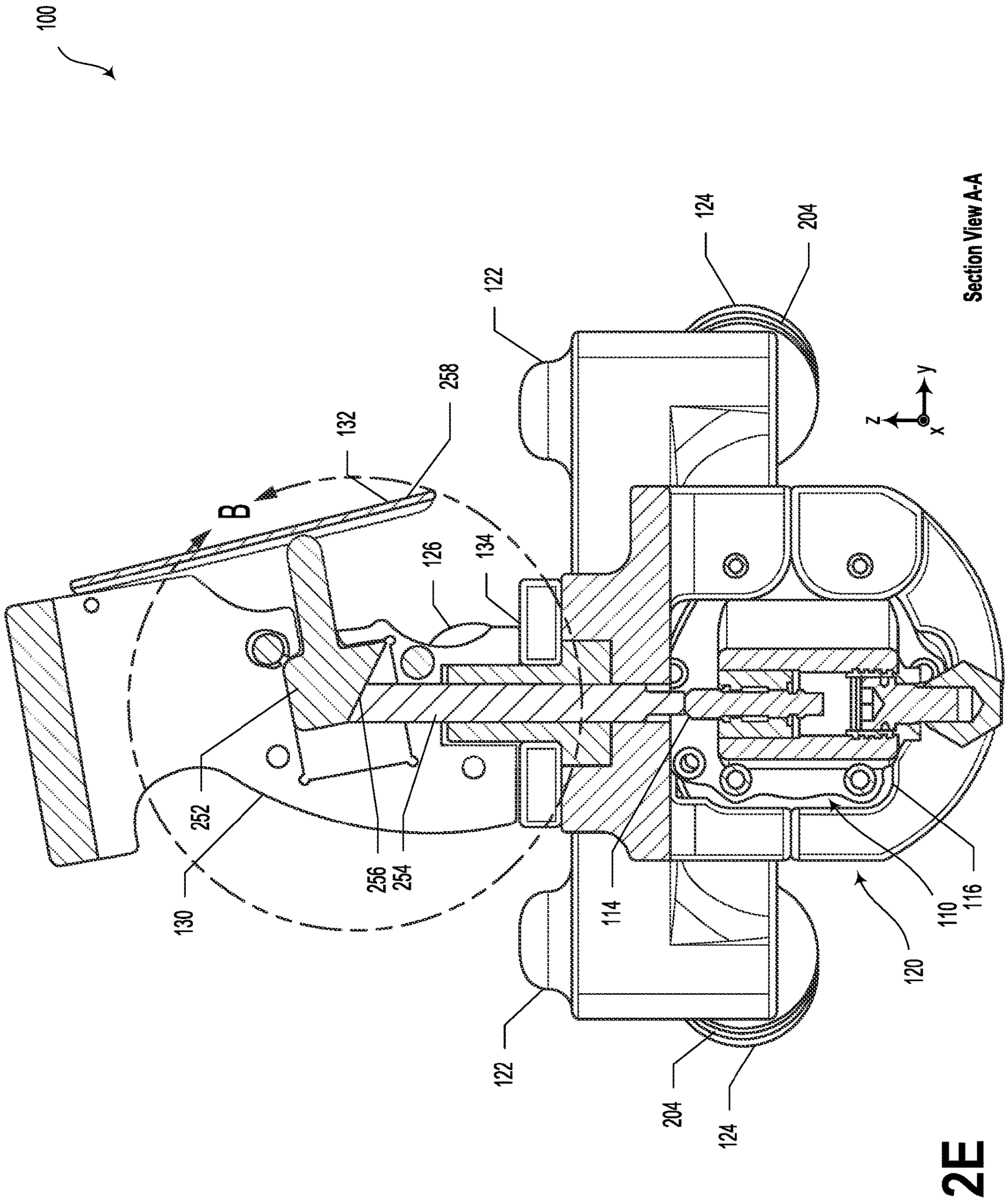
FIG. 2E illustrates the riveting apparatus of FIG. 1, according to an example implementation.

FIG. 2E illustrates a section A-A view of the riveting apparatus 100 of FIG. 1, according to an example implementation. As illustrated in FIG. 2E, in some embodiments, the actuatable switch 132 could include a hinged paddle portion 258 that may be configured to controllably depress a trigger portion 252 that slidably interacts with a plunger portion 254. Namely, when the paddle portion 258 is squeezed, the trigger portion 252 could slide inward, pushing the plunger portion 254 downward so as to depress a portion of the pneumatic valve 114 (e.g., the valve stem) so as to open the pneumatic valve 114 and cause pressurized air to flow and actuate the dynamic portion 212 of the riveting apparatus 100. In some embodiments, the interaction angle 256 could be selected so as to efficiently translate the horizontal motion of the trigger portion 252 to vertical motion of the plunger portion 254.

Figure 2F:
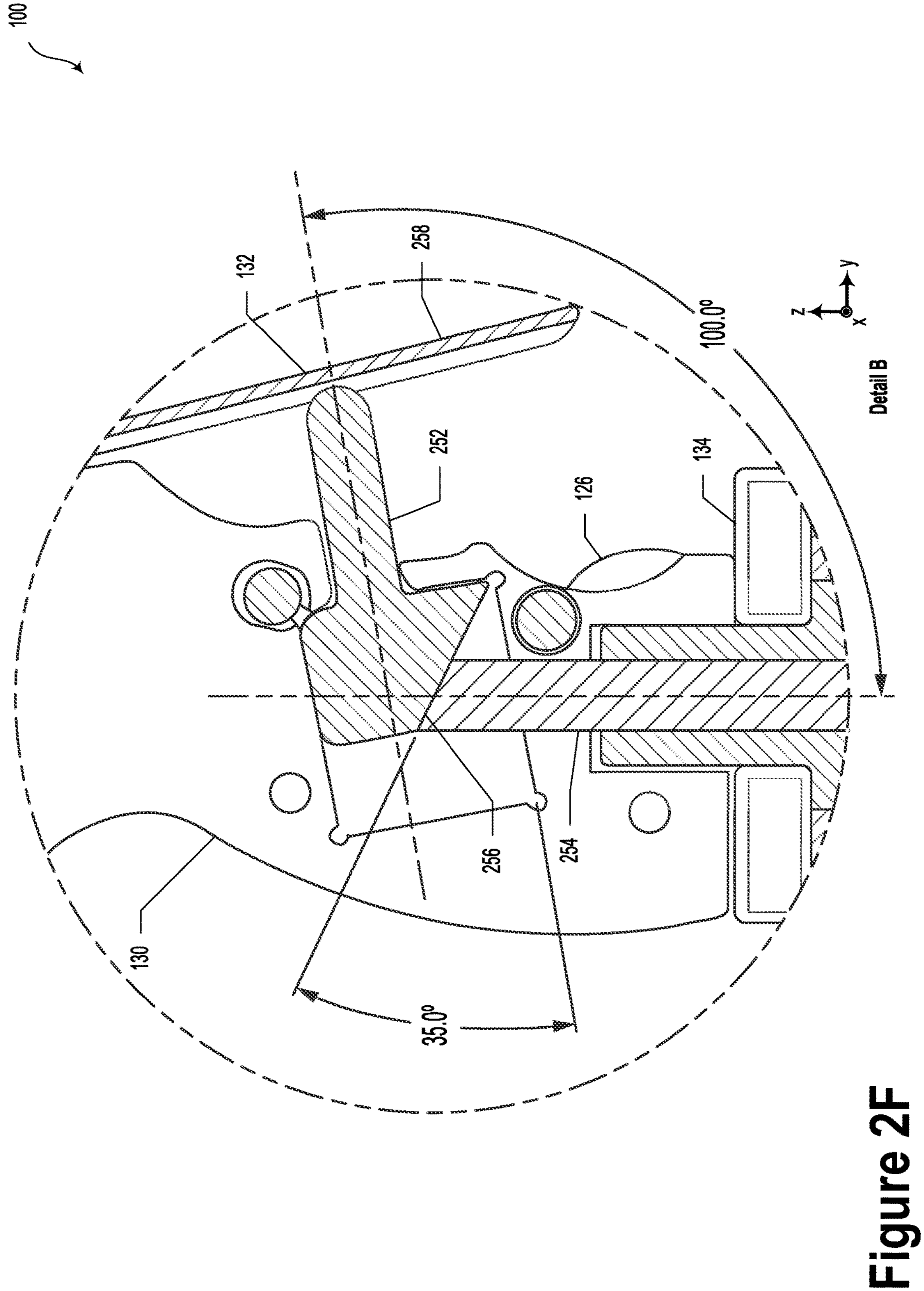
FIG. 2F illustrates the riveting apparatus of FIG. 1, according to an example implementation.

FIG. 2F illustrates a detail view of the riveting apparatus 100 of FIG. 1, according to an example implementation. As illustrated in FIG. 2F, the trigger portion 252 and the plunger portion 254 could form an interaction angle 256 of approximately 35 degrees. Other interaction angles (e.g., between 20 and 50 degrees) are possible and contemplated.

Figure 3A:
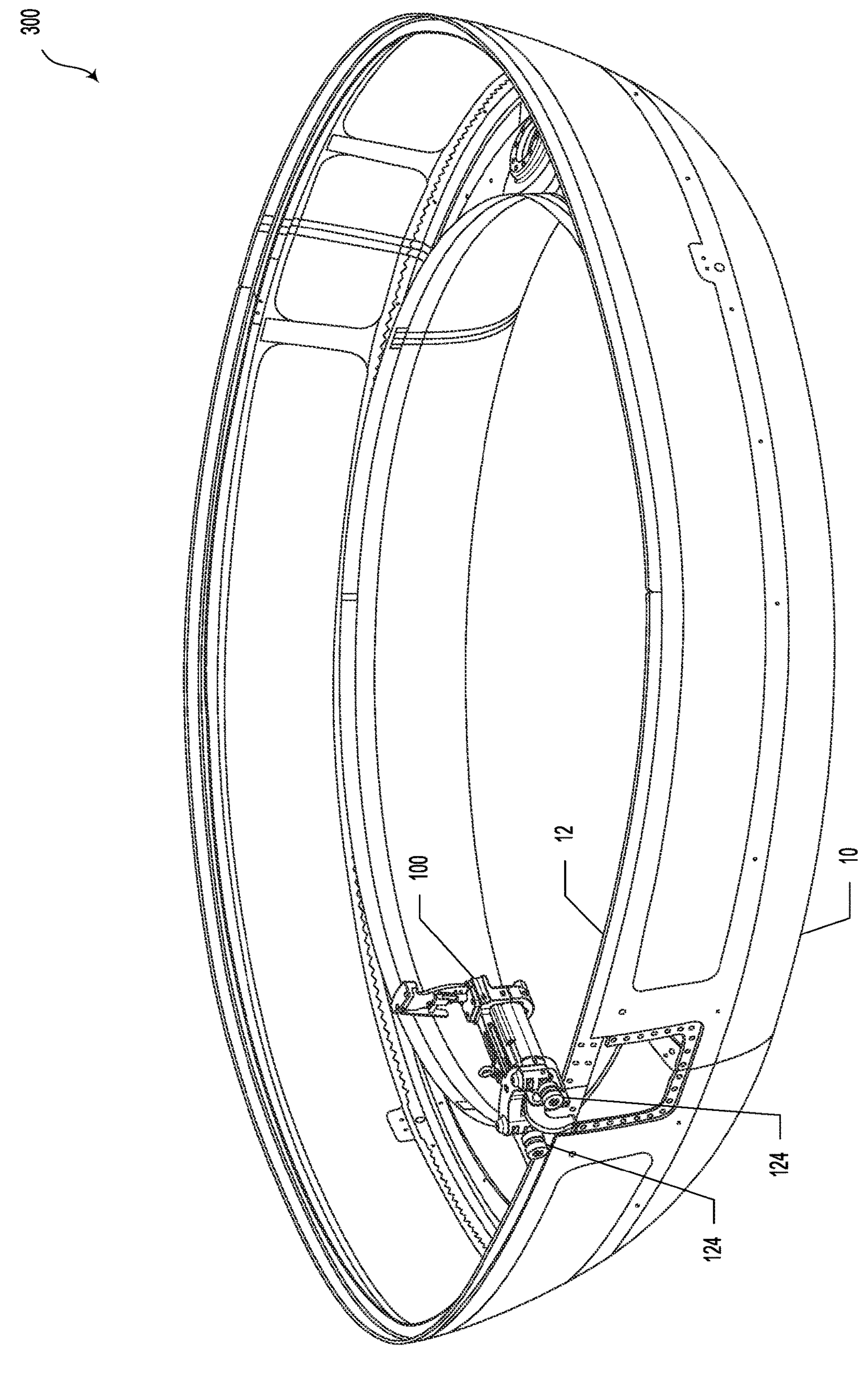
FIG. 3A illustrates an operating scenario, according to an example implementation.

FIG. 3A illustrates an oblique view of an operating scenario 300, according to an example implementation. As illustrated in FIG. 3A, a work-piece 10, such as an aircraft housing, could be positioned with respect to the riveting apparatus 100 so that the edge 12 engages with the edge rollers 124. In other words, in operation, the riveting apparatus 100 could be configured to be rollably adjusted along the edge 12 of the work-piece 10. In such scenarios, a plurality of rivets could be installed along a desired position that is a predetermined distance from the edge 12 of the work-piece 10.

Figure 3B:
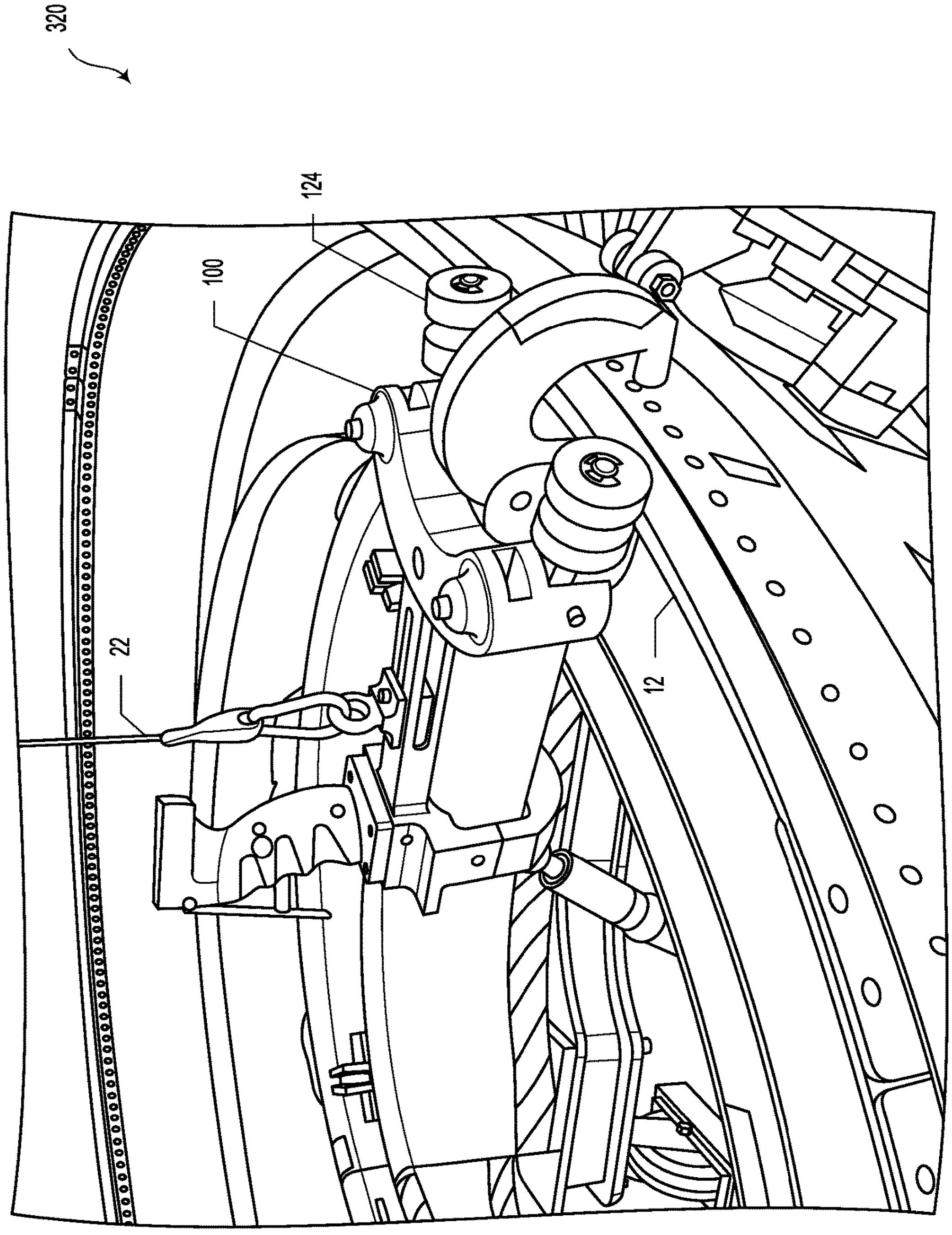
FIG. 3B illustrates an operating scenario, according to an example implementation.

FIG. 3B illustrates an oblique view of an operating scenario 320, according to an example implementation. As described elsewhere herein, the riveting apparatus 100 could be positioned so that the edge rollers 124 engage with the edge 12 of the work-piece 10. As illustrated in FIG. 3B and described herein, a support cable 22 could be coupled to the support eyelet 126 so as to relieve at least some of the weight of the riveting apparatus 100. In some embodiments, the riveting apparatus 100 could provide a more ergonomic riveting apparatus that incorporates a rivet alignment mechanism (e.g., the edge rollers 124), which may reduce user fatigue, reduce the risk of user injury, and may improve placement of rivets 30 on the work-piece 10.

III. Example Riveting Tools

While some embodiments described herein include a riveting apparatus 100 that includes a riveting tool 110 coupled to a support bracket 120 as illustrated in FIG. 1, other embodiments are possible and contemplated.

Figure 4:
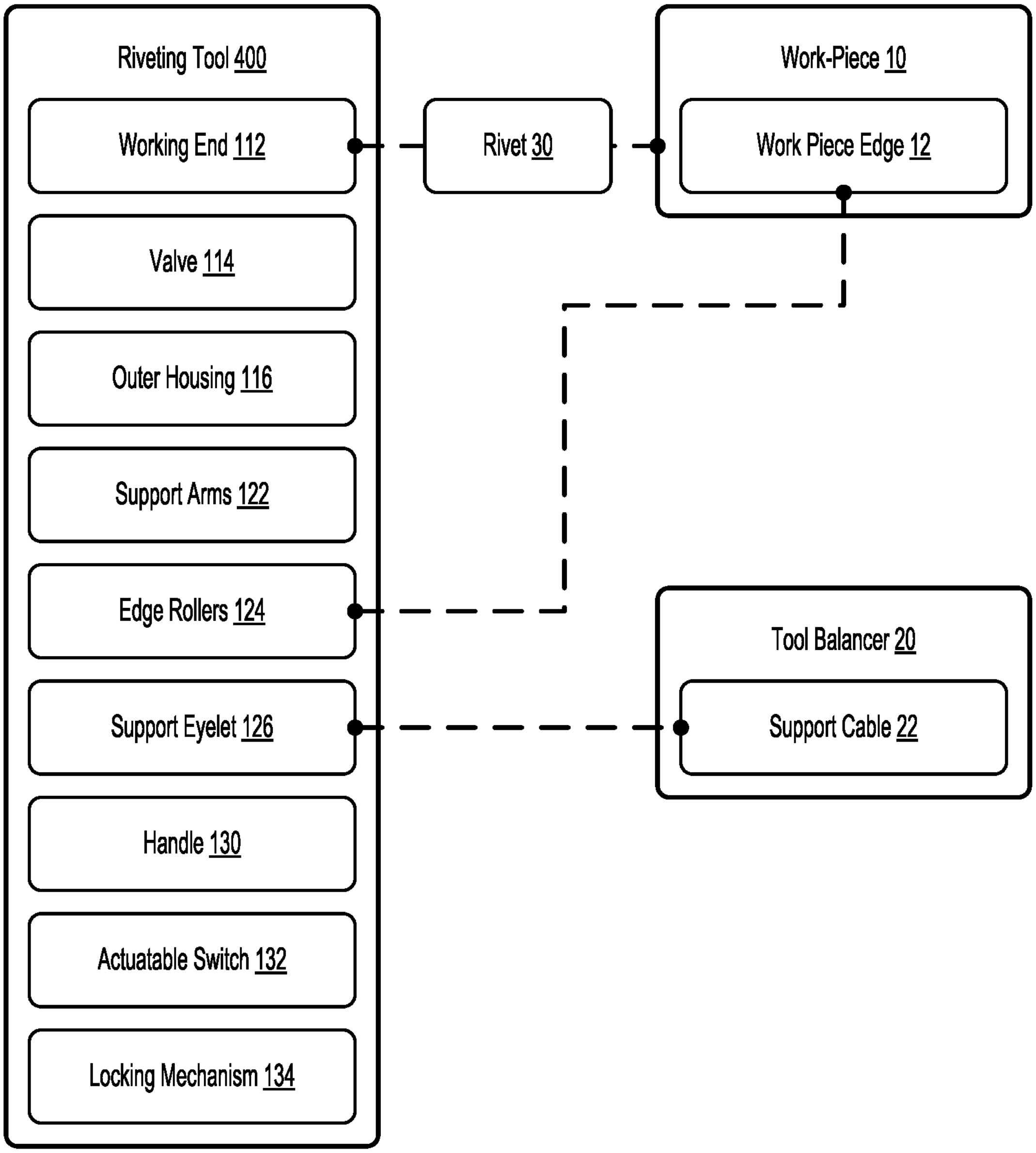
FIG. 4 illustrates a riveting tool, according to an example implementation.

FIG. 4 illustrates a riveting tool 400, according to an example implementation. The riveting tool 400 could incorporate at least some of the elements of the riveting apparatus 100 as illustrated and described in relation to FIG. 1.

The riveting tool 400 includes a working end 112 and an outer housing 116. The riveting tool 400 also includes a pair of spaced-apart edge rollers 124 coupled to the outer housing 116; being configured to rollably engage an edge 12 of a work-piece 10 so as to support the weight of the riveting tool 400 and enable movable adjustment of the working end 112 relative to the work-piece 10.

The riveting tool 400 includes a pneumatic valve 114 and a handle 130 that is rotatably mounted to the outer housing 116 to enable axial rotation of the handle 130. The handle 130 has an actuatable switch 132 configured to selectively operate the pneumatic valve 114.

In some embodiments, the riveting tool 400 may include a support eyelet 126. In such scenarios, the support eyelet 126 could provide a location to couple to a tool balancer device 20. In various embodiments, a position of the support eyelet 126 could be adjustable with respect to the outer housing 116.

IV. Example Methods

Figure 5:
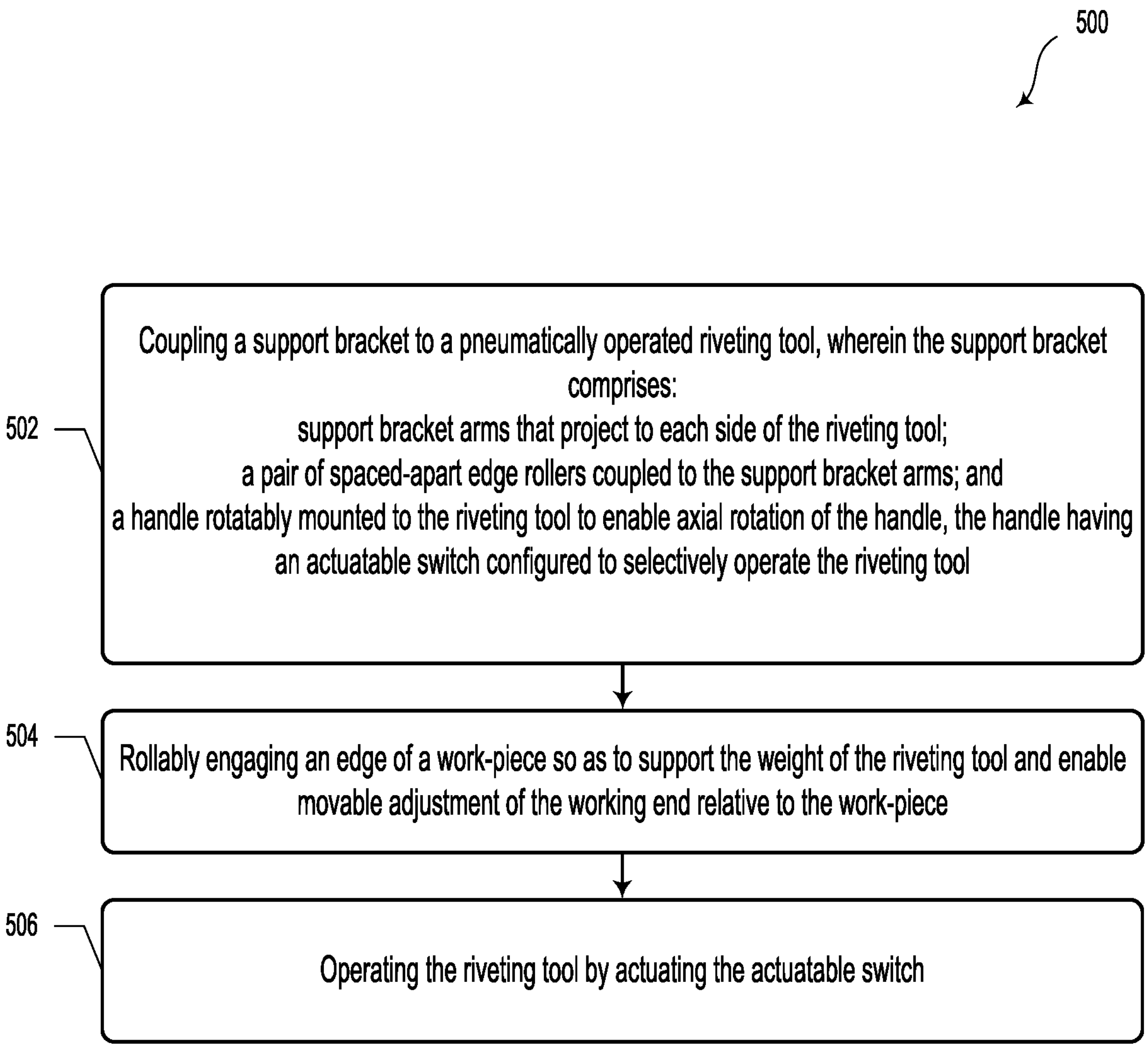
FIG. 5 illustrates a method, according to an example implementation.

FIG. 5 illustrates a method 500, according to an example implementation. Method 500 may involve elements of riveting apparatus 100 and/or riveting tool 400 as illustrated and described in reference to FIGS. 1 and 4. In some embodiments, method 500 could include methods of using the riveting apparatus 100 and/or the riveting tool 400. While FIG. 5 illustrates certain blocks or steps of method 500 as following a specific order, it will be understood that some blocks or steps could be omitted and/or other blocks or steps could be included. Furthermore, the blocks or steps could be carried out in a different order, in parallel (e.g., concurrently), and/or repeated.

Block 502 includes coupling a support bracket (e.g., support bracket 120) to a pneumatically operated riveting tool (e.g., riveting tool 110). In such scenarios, the support bracket could include support arms (e.g., support arms 122) that project outward from each side of the riveting tool. The support bracket also includes a pair of spaced-apart edge rollers (e.g., edge rollers 124) coupled to the support arms. The support bracket yet further includes a handle (e.g., handle 130) rotatably mounted to the riveting tool to enable axial rotation of the handle. The handle has an actuatable switch (e.g., actuatable switch 132) configured to selectively operate the riveting tool.

Block 504 includes rollably engaging an edge of a work-piece (e.g., edge 12 of work-piece 10) so as to support the weight of the riveting tool and enable movable adjustment of the working end relative to the work-piece. In some embodiments, rollably engaging the edge of the work piece could include positioning a slot (e.g., slot 204) of the edge rollers so as to receive the edge of the work piece.

Block 506 includes operating the riveting tool by actuating the actuatable switch. As described herein, the actuatable switch could be actuated by hand of a user of the riveting apparatus. Based at least in part on the handle being configured to axially rotate and/or the handle being shaped to fit a human hand (e.g., like a joystick grip or pistol grip), the method 500 could provide more ergonomic, efficient, and/or accurate use of the riveting apparatus.

In some embodiments, the method 500 could additionally include coupling the support bracket to a tool balancer device (e.g., tool balancer device 20) by way of a support eyelet (e.g., support eyelet 126). In various embodiments, method 500 could yet further include adjusting a position of the support eyelet along an outer housing (e.g., outer housing 116) of the riveting tool so as to ergonomically operate the riveting apparatus.

In some embodiments, actuating the actuatable switch could include depressing a grip-shaped handle (e.g., handle 130) with a pivotal trigger to actuate a valve (e.g., valve 114). In such scenarios, method 500 could additionally include supplying via the valve a flow of pressurized air to the riveting tool for selectively operating the riveting tool.

In various embodiments, the method 500 could include rotating the handle with respect to the riveting tool so as to enable use by a right-handed user or a left-handed user of the riveting tool.

In example embodiments, the method 500 could optionally include adjusting the pair of spaced-apart edge rollers that are coupled to the support arms in a manner such that the pair of edge rollers align with a contour of an edge (e.g., edge 12) of the work-piece.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

The invention claimed is:

1. A method comprising:

coupling a support bracket to a riveting tool having a working end for squeezing a rivet, wherein the support bracket comprises a pair of spaced-apart edge rollers;

rollably engaging an edge of a work-piece via the pair of spaced-part edge rollers so as to support at least a portion of a weight of the riveting tool by the pair of spaced-apart edge rollers and enable rolling movement of the riveting tool along the edge of the work-piece while the working end of the riveting tool remains positioned relative to the edge of the work-piece; and operating the riveting tool.

2. The method of claim 1, further comprising:

coupling the support bracket to a tool balancer device by way of a support eyelet.

3. The method of claim 1, wherein operating the riveting tool comprises:

actuating an actuatable switch of the riveting tool.

4. The method of claim 3, wherein actuating the actuatable switch comprises:

depressing a grip-shaped handle with a pivotal trigger to actuate a valve.

5. The method of claim 4, further comprising:

supplying, via the valve, a flow of pressurized air to the riveting tool for selectively operating the riveting tool.

6. The method of claim 5, further comprising:

selectively operating the riveting tool based on the flow of pressurized air.

7. The method of claim 1, wherein the support bracket comprises:

support arms that project to each side of the riveting tool, wherein the pair of spaced-apart edge rollers are coupled to the support arms; and a handle rotatably mounted to the riveting tool to enable axial rotation of the handle.

8. The method of claim 7, further comprising:

rotating the handle with respect to the riveting tool so as to enable use by a right-handed user or a left-handed user of the riveting tool.

9. The method of claim 7, further comprising:

rotating the handle with respect to the support bracket.

10. The method of claim 7, further comprising:

adjusting the pair of spaced-apart edge rollers that are coupled to the support arms in a manner such that the pair of spaced-apart edge rollers align with a contour of the edge of the work-piece.

11. The method of claim 1, wherein the riveting tool is a pneumatically operated riveting tool having a handle.

12. The method of claim 11, wherein the handle is shaped to fit a hand of a user.

13. The method of claim 1, further comprising:

releasably couple a support eyelet of the riveting tool to a suspended support cable such that the suspended support cable further supports a weight of the riveting tool.

14. The method of claim 13, wherein the riveting tool comprises an outer housing.

15. The method of claim 14, further comprising:

adjusting a position of the support eyelet relative to the outer housing of the riveting tool.

16. The method of claim 1, further comprising:

rotating a handle of the riveting tool through a plurality of lockable handle positions.

17. The method of claim 1, wherein the riveting tool comprises:

a three-dimensionally printed handle structure.

18. The method of claim 1, wherein the support bracket of the riveting tool is formed from a thermoplastic resin.

19. The method of claim 1, further comprising:

controlling electric current supplied to the riveting tool via a switching device located on a handle of the riveting tool.

20. The method of claim 1, further comprising:

controlling pressurized air supplied to the riveting tool via a switching device located on a handle of the riveting tool.

* * * * *